(12) United States Patent
Ranft et al.

(10) Patent No.: US 8,399,530 B2
(45) Date of Patent: Mar. 19, 2013

(54) POLYMER FOAMS

(75) Inventors: Meik Ranft, Bensheim-Hochstädten (DE); Armin Alteheld, Bad Kreuznach (DE); Andre Guerin Moreira, Ludwigshafen (DE); Wiebke Drenckhan, Orsay (FR); Antje van der Net, Ludwigshafen (DE); Alexander Gryson, Orsay (FR); Florence Elias, Paris (FR)

(73) Assignee: BASF SE, Ludwigshafen (DE)

(*) Notice: Subject to any disclaimer, the term of this patent is extended or adjusted under 35 U.S.C. 154(b) by 233 days.

(21) Appl. No.: 12/934,790

(22) PCT Filed: Mar. 26, 2009

(86) PCT No.: PCT/EP2009/053575
§ 371 (c)(1),
(2), (4) Date: Sep. 27, 2010

(87) PCT Pub. No.: WO2009/118373
PCT Pub. Date: Oct. 1, 2009

(65) Prior Publication Data
US 2011/0015288 A1    Jan. 20, 2011

(30) Foreign Application Priority Data
Mar. 27, 2008  (EP) .................................. 08153412

(51) Int. Cl.
*C08J 9/06* (2006.01)

(52) U.S. Cl. ............. 521/61; 521/63; 521/64; 521/65; 521/72; 521/147; 521/149

(58) Field of Classification Search .................. 521/61, 521/63, 64, 65, 72, 147, 149
See application file for complete search history.

(56) References Cited

U.S. PATENT DOCUMENTS

| | | | |
|---|---|---|---|
| 6,136,873 A | 10/2000 | Hahnle et al. | |
| 6,365,642 B1 * | 4/2002 | Dyer et al. | 521/64 |
| 6,455,600 B1 | 9/2002 | Hahnle et al. | |
| 6,750,262 B1 | 6/2004 | Hahnle et al. | |
| 2007/0054119 A1 | 3/2007 | Garstecki et al. | |

FOREIGN PATENT DOCUMENTS

| | | |
|---|---|---|
| EP | 0327376 A2 | 8/1989 |
| EP | 0640629 A1 | 3/1995 |
| WO | WO-94/22502 A1 | 10/1994 |
| WO | WO-97/17397 A1 | 5/1997 |
| WO | WO-99/44648 A1 | 9/1999 |
| WO | WO-00/52087 A1 | 9/2000 |

(Continued)

OTHER PUBLICATIONS

Hessel, et al., "Polymerisationen in mikrostrukturierten Reaktoren: Ein Überblick," *Chemie Ingenieur Technik*, (2005), vol. 77, No. 11, pp. 1693-1714.

(Continued)

*Primary Examiner* — Irina S Zemel
(74) *Attorney, Agent, or Firm* — Novak Druce Connolly Bove + Quigg LLP (57) ABSTRACT

A process for producing polymer foams by precise control of their morphology through use of microfluidic processes, foams produced in this way and use thereof.

15 Claims, 1 Drawing Sheet

FOREIGN PATENT DOCUMENTS

| WO | WO-03/045541 A2 | 6/2003 |
| WO | WO-2005/103106 A1 | 11/2005 |
| WO | WO-2006/039568 A1 | 4/2006 |
| WO | WO-2007/068127 A1 | 6/2007 |

OTHER PUBLICATIONS

Whitesides, "The origins and the future of microfluidics," *Nature*, (Jul. 27, 2006), vol. 442, pp. 368-373.

Ganan-Calvo, et al., "Perfectly Monodisperse Microbubbling by Capillary Flow Focusing," *Physical Review Letters*, (Dec. 31, 2001), vol. 87, No. 27, pp. 274501-1-274501-4.

Anna, et al., "Formation of dispersions using 'flow-focusing' in microchannels," *Applied Physics Letters*, (Jan. 20, 2003), vol. 82, No. 3, pp. 364-366.

Tice, et al., "Formation of Droplets and Mixing in Multiphase Microfluidics at Low Values of the Reynolds and the Capillary Numbers," *Langmuir*, (2003), vol. 19, pp. 9127-9133.

Jeong, et al., "Hydrodynamic microfabrication via 'on the fly' photopolymerization of microscale fibers and tubes," *Lab Chip*, (2004), vol. 4, pp. 576-580.

Xu, et al., "Generation of Monodisperse Particles by Using Microfluidics: Control over Size, Shape, and Composition," *Angew. Chem.*, (2005), vol. 117, pp. 734-738.

Nie, et al., "Polymer Particles with Various Shapes and Morphologies Produced in Continuous Microfluidic Reactors," *J. Am. Chem. Soc.*, (2005), vol. 127, pp. 8058-8063.

Seo, et al., "Continuous Microfluidic Reactors for Polymer Particles," *Langmuir*, (2005), vol. 21, pp. 11614-11622.

Abraham, et al., "Microfluidics assisted synthesis of well-defined spherical polymeric microcapsules and their utilization as potential encapsulants," *Lab Chip*, (2006), vol. 6, pp. 752-756.

Zhang, et al., "Microfluidic Production of Biopolymer Microcapsultes with Controlled Morphology," *J. Am. Chem. Soc.*, (2006), vol. 28, pp. 12205-12210.

Steinbacher, et al., "Rapid Self-Assembly of Core-Shell Organosilicon Microcapsules within a Microfluidic Device," *J. Am. Chem. Soc.*, (2006), vol. 128, pp. 9442-9447.

Kim, et al., "Fabrication of Monodisperse Gel Shells and Functional Microgels in Microfluidic Devices," *Angew. Chem.*, (2007), vol. 119, pp. 1851-1854.

Hashimoto, et al., "Synthesis of Composite Emulsions and Complex Foams with the use of Microfluidic Flow-Focusing Devices," *Small*, (2007), vol. 3, No. 10, pp. 1792-1802.

Serra, et al., "A Predictive Approach of the Influence of the Operating Parameters on the Size of Polymer Particles Synthesized in a Simplified Microfluidic System," *Langmuir*, (2007), vol. 23, pp. 7745-7750.

\* cited by examiner

POLYMER FOAMS

CROSS-REFERENCE TO RELATED APPLICATIONS

This application is a national stage application (under 35 U.S.C. §371) of PCT/EP2009/053575, filed Mar. 26, 2009, which claims benefit of European application 08153412.5, filed Mar. 27, 2008.

BACKGROUND OF THE INVENTION

The invention relates to an improved process for producing ordered polymer foams from emulsifier foam precursors by microfluidic processes and to correspondingly produced polymer foams and to the use thereof.

Polymer foams have various uses, for example for thermal insulation, for mechanical damping, for sound absorption, as packaging materials or, for example, as water-absorbing, crosslinked polymers as superabsorbents. WO 97/17397 discloses water-absorbing crosslinked polymer foams which are obtainable by foaming a polymerizable mixture which comprises, inter alia, monoethylenically unsaturated monomers, the foaming being effected by dispersing fine bubbles of an inert gas and polymerizing the foamed mixture to form a hydrogel foam. The foam is produced separately from the polymerization, and the production can be carried out, for example, in industrial apparatus which is known for the production of urea-formaldehyde foams or, in a simple case, in a conventional food processor equipped with egg beaters. WO 00/52087 discloses foaming a polymerizable aqueous mixture by first forming an inert gas in the polymerizable, aqueous mixture and then decompressing it to atmospheric pressure. WO 99/44648 discloses neutralizing the monoethylenically unsaturated monomers used to produce a foam with alkanolamines.

It is possible to produce a polymer foam with a defined chemical composition by these processes. However, there is a need to improve the precise control of the morphology of foams.

It is already known that microfluidic processes can be used to produce microparticles. Microfluidic processes are already described in terms of principle in G. M. Whiteside, The Origins and the Future of Microfluidics, Nature 442, 368-372 (2006); M. Hashimoto, P. Garstecki, and G. M. Whitesides, Synthesis of Composite Emulsions and Complex Foams with the use of Microfluidic Flow-Focusing Devices, small 3 (10), 1792-1802 (2007); J. D. Tice, H. Song, A. D. Lyon, and R. F. Ismagilov, Formation of Droplets and Mixing in Multiphase Microfluidics at Low Values of the Reynolds and the Capillary Numbers, Langmuir 19, 9127-9133 (2003); A. M. Ganan-Calvo and J. M. Gordillo, Perfectly Monodisperse Microbubbling by Capillary Flow Focusing, Phys. Rev. Lett. 87 (27), 274501-1-274051-4 (2001); S. L. Anna, N. Bontoux, and H. A. Stone, Formation of dispersions using "flow focusing" in microchannels, Appl. Phys. Lett. 82 (3), 364-366 (2003).

Microfluidic processes and the microscale process technology components used here are notable for the following characteristics: small characteristic lengths in the submillimeter range (a few to a few hundred micrometers), for example from 10 to 1000 micrometers, especially from 100 to 750 micrometers, with small volumes (in the range from 1 nanoliter to 1 femtoliter) of the resulting bubbles, which cause a high surface-to-volume ratio of preferably at least 1000 $m^2/m^3$, and also extremely small Reynolds numbers of less than 1000, especially between 1 and 1000, preferably between 1 and 250, especially between 1 and 100. This has the consequence of purely laminar flows, such that the mixing of chemical solutions is limited to purely diffuse operations (instead of kinetic operations). Residence times of substances in microfluidic equipment are generally very short (fractions of seconds), but can be adjusted as desired to the intended reaction.

It is already known that monodisperse particles of defined size and morphology can be produced by microfluidic processes; see, for example, W. Jeong, J. Kim, S. Kim, S. Lee, G. Mensing, and D. J. Beebe, Hydrodynamic microfabrication via "on the fly" photopolymerization of microscale fibers and tubes, Lab Chip 4, 576-580 (2004); V. Hessel, C. Serra, H. Löwe and G. Hadziioannou, Polymerisationen in mikrostrukturierten Reaktoren: Ein Überblick, Chem. Ing. Tech. 77 (11), 1693-1714 (2005); S. Xu, Z. Nie, M. Seo, P. Lewis, E. Kumacheva, H. A. Stone, P. Garstecki, D. B. Weibel, I. Gitlin, and G. M. Whitesides, Generation of Monodisperse Particles by Using Microfluidics: Control over Size, Shape, and Composition, Angew. Chem. 117, 734-738 (2005); Z. Nie, S. Xu, M. Seo, P. C. Lewis, and E. Kumacheva, Polymer Particles with Various Shapes and Morphologies Produced in Continuous Microfluidic Reactors, J. Am. Chem. Soc. 127, 8058-8063 (2005); M. Seo, Z. Nie, S. Xu, M. Mok, P. C. Lewis, R. Graham, and E. Kumacheva, Continuous Microfluidic Reactors for Polymer Particles, Langmuir 21, 11614-11622 (2005); S. Abraham, E. H. Jeong, T. Arakawa, S. Shoji, K. C. Kim, I. Kim, and J. S. Go, Microfluidics assisted synthesis of well-defined spherical polymeric microcapsules and their utilization as potential encapsulants, Lab Chip 6, 752-756 (2006); H. Zhang, E. Tumarkin, R. Peerani, Z. Nie, R. M. A. Sullan, G. C. Walker, and E. Kumacheva, Microfluidic Production of Biopolymer Microcapsules with Controlled Morphology, J. Am. Chem. Soc. 128, 12205-12210 (2006); J. L. Steinbacher et al., Rapid Self-Assembly of Core-Shell Organosilicon Microcapsules within a Microfluidic Device, J. Am. Chem. Soc. 128, 9442-9447 (2006); J.-W. Kim, A. S. Utada, A. Fernandez-Nieves, Z. Hu, and D. A. Weitz, Fabrication of Monodisperse Gel Shells and Functional Microgels in Microfluidic Devices, Angew. Chem. 119, 1851-1854 (2007); C. SERRA, N. Berton, M. Bouquey, L. Prat, and G. Hadziioannou, A Predictive Approach of the Influence of the Operating Parameters on the Size of Polymer Particles Synthesized in a Simplified Microfluidic System, Langmuir 23, 7745-7750 (2007).

US 2007/0054119 A1 already discloses the use of microfluidic systems and techniques to produce monodisperse particles which comprise metal and/or nylon, a polymer precursor being conducted into a microfluidic channel to form the particles and being hardened in the channel.

WO 2005/103106 A1 also discloses producing polymer particles of defined shape and morphology by injecting different fluids into a microfluidic channel and hardening.

BRIEF SUMMARY OF THE INVENTION

It is an object of the invention to provide improved polymer foams with defined structure and morphology, and especially processes for producing them.

The invention relates to a process for producing polymer foams by
1. contacting a solution L1 comprising at least one polymerizable compound and a solvent L, and if appropriate at least one solution L2 comprising a polymerizable compound and a solvent which may be identical or non-identical to the solvent from L1, with 2. one or more gas(es) G which is/are only partly dissolvable, if at all, in the solvents used, at least one of the solutions comprising an emulsifier or another assistant, to form a foam as a result of development of struts and/or walls by the solutions which enclose the gas G as bubbles, and
3. polymerizing in a subsequent process stage, wherein the solutions and the gas G are contacted under microfluidic process conditions to develop bubbles of the gas G.

DETAILED DESCRIPTION OF THE INVENTION

In a preferred embodiment, the solutions and the gas G are contacted in a channel K of a microreactor, the gas G and the solutions moving in a common flow direction within the channel K.

In a preferred embodiment, the gas G is surrounded completely by the polymerizable compound before exiting from the exit channel K in portions. This can additionally be ensured by the upstream placement of a mixing channel MK. The exit channel K preferably has a diameter of from a few micrometers up to several hundred micrometers and a length which corresponds to several times the selected diameter. The selection of the channel diameter influences the size of the bubbles of the gas G generated, while a channel length selected at a sufficient level ensures the monomodality of the bubbles and additionally sufficient mixing of the chemical substances. The diameter of the mixing channel MK (if present) should be several times greater than the exit channel.

In the context of this invention, polymerizations are understood to mean processes which are suitable for forming macromolecules, especially
polymerizations of unsaturated monomers with dissolution of the double bond and formation of long chains of the polymerized monomers
polyadditions of monomers to polyadducts, especially the formation of polyurethanes and polyureas, by joining different kinds of molecules with at least two functional groups
polycondensations by linking monomers to eliminate small molecules, for example water.

Polymers are understood to mean the high molecular weight compounds obtained in the polymerization, and monomers to mean the corresponding low molecular weight starting compounds.

Microfluidic process conditions are characterized especially by the following parameters:
1. a small characteristic length of the mixing channel MK (when present) and a small diameter of the exit channel K (preferably from 10 micrometers to 1000 micrometers, especially from 100 micrometers to 750 micrometers), such that diffusion processes can lead to sufficient mixing of the chemical substances.
2. a small internal volume, generally within the order of magnitude of from 1 cubic millimeter to 1 cubic centimeter;
3. combination of the starting materials in the reactor for focusing the streams, in which gas G and solutions L exit through the narrow exit channel K whose diameter corresponds to from a few micrometers up to a few hundred micrometers and whose length to several times the diameter.

Figure 1:
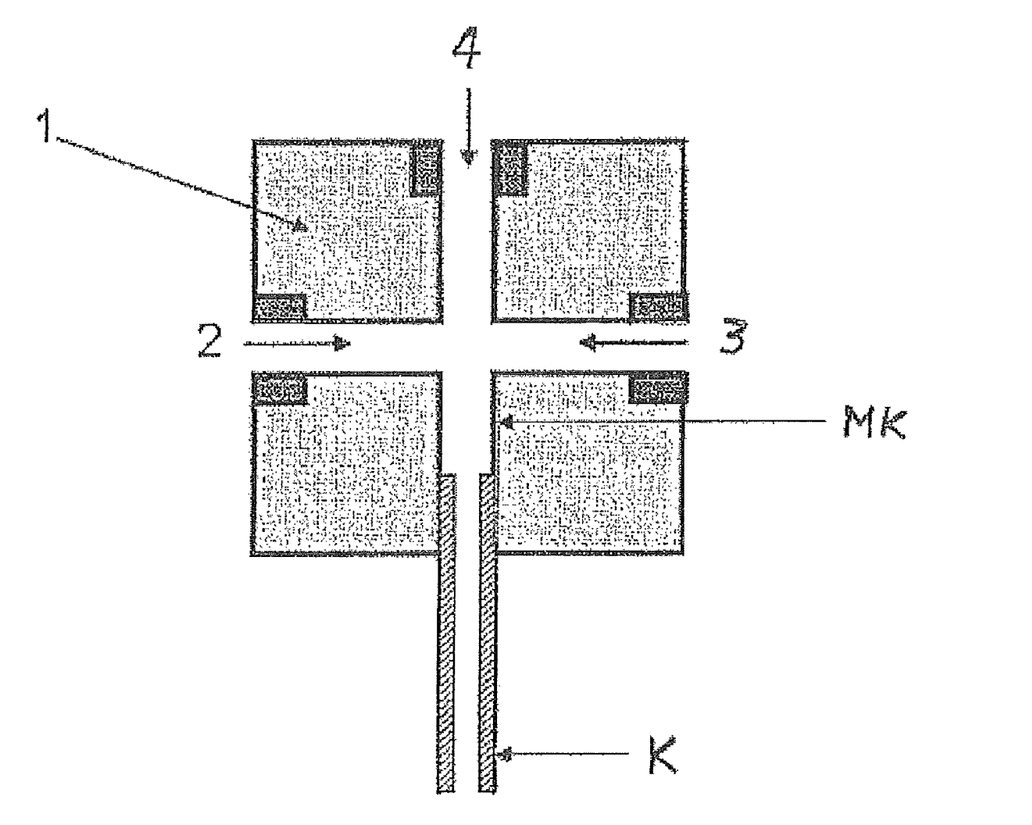
FIG. 1 shows a corresponding reactor composed of a block 1 with feeds 2 and 3 for the solutions L, and the feed 4 for the gas G, a mixing channel MK for the solutions and the gas G, and the exit channel K.

In one embodiment of the invention, the process is conducted in a reactor which has separate feed lines for the solutions L and the gas G, and an exit channel K. FIG. 1 shows a corresponding reactor composed of a block 1 with feeds 2 and 3 for the solutions L, and the feed 4 for the gas G, a mixing channel MK for the solutions and the gas G, and the exit channel K.

It will be appreciated that it is possible to produce larger conversions by connecting such reactors in parallel or by combining them to a bundle reactor.

The invention further relates to polymer foams which are producible by the process according to the invention and are characterized by at least one of the following parameters:
1. The size of the gas bubbles is within the range from a few micrometers (e.g. 10 µm) to a few millimeters (e.g. 2 mm). This is suitable in particular for the generation of monomodal foams with an exceptionally low polydispersity (2-5%).
2. The polymer foam density is fixed exactly (within the imprecision of the equipment) by the flow rates of the gas G and of the solutions L and can therefore be selected as desired and is, for example, from $10^{-5}$ to $10^2$ g/cm$^3$, especially from $5 \times 10^{-3}$ to 1 g/cm$^3$.
3. Since the polymerization is preceded by a stage whose duration can be extended according to the foam stability and in which the continuous phase is fluid and low in viscosity, the gas bubbles can become arranged in their physical equilibrium structure. Monomodal foams with a high liquid content in particular then form ordered foam structures (tight "sphere packing"). It is possible subsequently (and before the polymerization) to remove liquid by applying reduced pressure in order to additionally reduce the foam density.

In one embodiment, polymerizable aqueous mixtures I which comprise the following components are used:
(A) monoethylenically unsaturated monomers,
(B) crosslinker,
(C) initiator,
(D) emulsifier,
(G) gas
(L) solvent (I-A) Monomers for the Polymerizable Aqueous Mixtures According to the invention, a polymerizable aqueous mixture is processed with a microfluidic unit to give a foam which is stable to processing and can be shaped as desired. The polymerizable aqueous mixture comprises, as components (A), for example, monoethylenically unsaturated monomers composed of linear or branched carboxylic acids or their anhydrides or carboxamides or carboxylic esters formed from linear or branched alkanols, or monoethylenically unsaturated alkyl- or arylsulfonic acids.

It is possible to use monoethylenically unsaturated carboxylic acids, for example acrylic acid, methacrylic acid, ethacrylic acid; α-chloroacrylic acid, crotonic acid, fumaric acid, maleic acid, maleic anhydride, mesaconic acid, glutaconic acid, aconitic acid, itaconic acid and itaconic anhydride, citraconic aid and acylamidoglycolic acid. Also suitable are ethylenically unsaturated alkyl- or arylsulfonic acids, such as vinylsulfonic acid, allylsulfonic acid, methallylsulfonic acid, sulfoethyl acrylate, sulfoethyl methacrylate, sulfopropyl acrylate, sulfopropyl methacrylate, vinylbenzenesulfonic acid, acrylamidoethanesulfonic acid, 2-acrylamido-2-methylpropanesulfonic acid, 2-sulfoethyl acrylate, 2-sulfoethyl methacrylate, 3-sulfopropyl acrylate, 3-sulfopropyl methacrylate, 2-hydroxy-3-acryloyloxypropylsulfonic acid, 2-hydroxy-3-methacryloyloxypropylsulfonic acid, vinylphosphonic acid, allylphosphonic acid.

Useful monomers of group (I-A) are also carboxamides or carboxylic esters or nitriles of the monoethylenically unsaturated carboxylic acids listed above. Especially the carboxylic esters with linear or branched alkanols, for example methyl, ethyl, n-propyl, n-butyl, isobutyl, n-pentyl, n-hexyl, 2-ethylhexyl or cyclic $C_5$- to $C_{10}$-cycloalkyl groups, such as the cyclopentyl or cyclohexyl radical. Additionally carboxamides, for example, acrylamide, methacrylamide, or nitriles such as acrylonitrile, and $C_4$ to $C_8$ conjugated dienes, such as 1,3-butadiene and isoprene.

Additionally useful are monomers which have with at least one hydroxyl, keto and/or silane group in the side chain. Especially useful are hydroxyethyl (meth)acrylate, hydroxypropyl (meth)acrylate, polyethylene oxide (meth)acrylate, acetoacetoxy methacrylate and polyvinyl alcohol. Their water solubility is typically above 100 g/1000 $cm^3$ of water at 25° C. Mention should also be made of glycidyl (meth)acrylate, acetoacetoxy methacrylate, ureidoethyl methacrylate, acrylamidoethylethyleneurea, N,N'-bis(acrylamidoethyl) ethyleneurea.

It is likewise possible to polymerize silanes which comprise olefinic double bonds, for example vinylsilanes or methacryloyloxyalkylsilanes. In addition, silane groups can be introduced according to EP-A-0 640 629 by polymerizing in the presence of epoxysilanes, for example glycidyloxypropyltrimethoxysilane, or according to EP-A-0 327 376 by polymerizing in the presence of mercaptoalkyltrisalkoxysilane. Compounds which possess N-methylol groups can likewise be used as monomers. Examples of such compounds are N-methylolacrylamide and N-methylolmethacrylamide.

The monomers can be used alone or in a mixture with one another in the production of foams. In addition, water is added to the mixture.

The mixtures are neutralized if appropriate. For neutralization, for example, alkali metal bases or ammonia or amines are used. For the neutralization, preference is given to using sodium hydroxide solution or potassium hydroxide solution or N,N,N',N'-tetramethylethylenediamine. However, the neutralization can also be undertaken with the aid of sodium carbonate, sodium hydrogencarbonate, calcium oxide, calcium hydroxide, potassium carbonate or potassium hydrogencarbonate or other carbonates, hydrogencarbonates.

(I-B) Crosslinkers for the Polymerizable Aqueous Mixtures

Useful crosslinkers for the polymerizable aqueous mixture include monomers which have at least 2 ethylenically unsaturated double bonds. Examples of such monomers are N,N'-methylenebisacrylamide, polyethylene glycol diacrylates and polyethylene glycol dimethacrylates, trimethylolpropane triacrylate, trimethylol-propane trimethacrylate, ethylene glycol diacrylate, propylene glycol diacrylate, ethylene glycol dimethacrylate, propylene glycol dimethacrylate, butanediol diacrylate, hexanediol diacrylate, hexanediol dimethacrylate, allyl methacrylate, diacrylates and dimethacrylates of block copolymers formed from ethylene oxide and propylene oxide, di or triacrylated or -methacrylated polyhydric alcohols, such as glycerol or pentaerythritol, triallylamine, tetraallylethylenediamine, divinylbenzene, diallyl phthalate, polyethylene glycol divinyl ethers of polyethylene glycols of molecular weight from 106 to 4000, trimethylolpropane diallyl ether, butanediol divinyl ether, pentaerythrityl triallyl ether and/or divinylethyleneurea. Preference is given to using water-soluble crosslinkers, for example N,N'-methylenebis acrylamide, polyethylene glycol diacrylates and polyethylene glycol dimethacrylates, which derive from addition products of from 2 to 400 mol of ethylene oxide onto 1 mol of a diol or polyol, vinyl ethers of addition products of from 2 to 400 mol of ethylene oxide onto 1 mol of a diol or polyol, ethylene glycol diacrylate, ethylene glycol dimethacrylate, or triacrylates and trimethacrylates of addition products of from 6 to 20 mol of ethylene oxide onto 1 mole of glycerol, pentaerythrityl triallyl ether and/or divinylurea.

Useful crosslinkers also include compounds which comprise at least one polymerizable ethylenically unsaturated group and at least one further functional group. The functional group of these crosslinkers must be capable of reacting with the functional groups, essentially the carboxyl groups or sulfonic acid groups of the monomers (I-A). Suitable functional groups are, for example, hydroxyl, amino, epoxy and aziridino groups.

Useful crosslinkers also include those compounds which bear at least two functional groups which can react with carboxyl and sulfonic acid groups of the monomers of group (I-A) used. The suitable functional groups have already been specified above, i.e. hydroxyl, amino, epoxy, isocyanate, ester, amide and aziridino groups. Examples of such crosslinkers are ethylene glycol, diethylene glycol, triethylene glycol, tetraethylene glycol, polyethylene glycol, glycerol, polyglycerol, propylene glycol, polypropylene glycol, block copolymers formed from ethylene oxide and propylene oxide, sorbitan fatty acid esters, ethoxylated sorbitan fatty acid esters, trimethylolpropane, pentaerythritol, 1,3-butanediol, 1,4-butanediol, polyvinyl alcohol, sorbitol, polyglycidyl ethers such as ethylene glycol diglycidyl ether, polyethylene glycol diglycidyl ether, glyceryl diglycidyl ether, glyceryl polyglycidyl ether, diglyceryl polyglycidyl ether, polyglyceryl polyglycidyl ether, sorbitol polyglycidyl ether, pentaerythrityl polyglycidyl ether, propylene glycol diglycidyl ether and polypropylene glycol diglycidyl ether, polyaziridine compounds such as 2,2-bishydroxymethylbutanol tris [3-(1-aziridinyl)propionate], 1,6-hexamethylenediethyleneurea, diphenyl-methane-bis-4,4'-N,N'-diethyleneurea, haloepoxy compounds such as epichlorohydrin and α-methylfluorohydrin, polyisocyanates such as 2,4-toluylene diisocyanate and hexamethylene diisocyanate, alkylene carbonates such as 1,3-dioxolan-2-one and 4-methyl-1,3-dioxolan-2-one, polyquaternary amines such as condensation products of dimethylamine with epichlorohydrin, homo- and copolymers of diallyldimethylammonium chloride, and homo- and copolymers of dimethylaminoethyl (meth)acrylate, which may be quaternized with, for example, methyl chloride.

Further suitable crosslinkers are polyvalent metal ions which are capable of forming ionic crosslinks. Examples of such crosslinkers are magnesium, calcium, barium and aluminum ions. These crosslinkers are added to the aqueous polymerizable solution, for example, in the form of hydroxides, carbonates or hydrogencarbonates. A particularly preferred crosslinker of this kind is sodium aluminate.

Further suitable crosslinkers are multifunctional bases which are likewise capable of forming ionic crosslinks, for example polyamines or quaternized salts thereof. Examples of polyamines are ethylenediamine, diethylene triamine, triethylene tetramine, tetraethylene pentamine, pentaethylenehexamine and polyethyleneimines, and polyvinylamines having molar masses of in each case up to 4 000 000.

(I-C) Initiators for the Polymerizable Aqueous Mixtures

The polymerization initiators used may be all compounds which decompose to free radicals under the polymerization conditions, for example peroxides, hydroperoxides, hydrogen peroxide, persulfates, azo compounds and the so-called redox catalysts. Preference is given to the use of water-soluble initiators. Initiation of the polymerization by the action of electron beams on the polymerizable aqueous mixture is also possible. However, the polymerization can also be induced in the absence of initiators of the abovementioned type by the action of high-energy radiation in the presence of photoinitiators. In some cases, it is advantageous to use mixtures of different polymerization initiators, for example mixtures of hydrogen peroxide and sodium peroxodisulfate or potassium peroxodisulfate. Mixtures of hydrogen peroxide and sodium peroxodisulfate can be used in any desired ratio. Suitable organic peroxides are, for example, acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, di(2-ethylhexyl) peroxodicarbonate, dicyclohexyl peroxydicarbonate, di(4-tert-butylcyclohexyl) peroxodicarbonate, dimyristyl peroxodicarbonate, diacetyl peroxodicarbonate, allyl perester, cumyl peroxyneodecanoate, tert-butyl per-3,5,5-trimethylhexanoate, acetylcyclohexylsulfonyl peroxide, dilauryl peroxide, dibenzoyl peroxide and tert-amyl perneodecanoate. Particularly suitable polymerization initiators are water-soluble azo initiators, for example 2,2'-azobis(2-amidinopropane) dihydrochloride, 2,2'-azobis(N,N'-dimethylene)isobutyramidine dihydrochloride, 2-(carbamoylazo)isobutyronitrile, 2,2'-azobis[2-(2'-imidazolin-2-yl)propane]dihydrochloride and 4,4'-azobis-(4-cyanovaleric acid).

Useful initiators are also redox catalysts. The redox catalysts comprise, as the oxidizing component, at least one of the above-specified per compounds and, as the reducing component, for example, ascorbic acid, glucose, sorbose, ammonium hydrogensulfite, sulfite, thiosulfate, hyposulfite, pyrosulfite or sulfide, alkali metal hydrogensulfite, sulfite, thiosulfate, hyposulfite, pyrosulfite or sulfide, metal salts such as iron(II) ions or silver ions, or sodium hydroxymethylsulfoxylate.

When the polymerization is induced by the action of high-energy radiation, the initiators used are typically so-called photoinitiators. These may, for example, be so-called α-splitters, H-abstracting systems or else azides. Examples of such initiators are benzophenone derivatives such as Michler's ketone, phenanthrene derivatives, fluorene derivatives, anthraquinone derivatives, thioxanthone derivatives, coumarin derivatives, benzoin ethers and derivatives thereof, azo compounds such as the abovementioned free-radical formers, substituted hexaarylbisimidazoles or acylphosphine oxides. Examples of azides are: 2-(N,N-dimethylamino)ethyl 4-azidocinnamate, 2-(N,N-dimethylamino)ethyl 4-azidonaphthyl ketone, 2-(N,N-dimethylamino)ethyl 4-azidobenzoate, 5-azido-1-naphthyl 2'-(N,N-dimethylamino)ethyl sulfone, N-(4-sulfonylazidophenyl)maleimide, N-acetyl-4-sulfonylazidoaniline, 4-sulfonylazidoaniline, 4-azidoaniline, 4-azidophenacyl bromide, p-azidobenzoic acid, 2,6-bis(p-azidobenzylidene)cyclohexanone and 2,6-bis(p-azidobenzylidene)-4-methylcyclohexanone.

(I-D) Emulsifiers and Other Assistants

The emulsifiers are of crucial significance for the production and the stabilization of the foam. It is possible to use anionic, cationic or nonionic emulsifiers or emulsifier mixtures which are compatible with one another. It is possible to use low molecular weight or else polymeric emulsifiers (protective colloids), combinations of different types or else the same type of emulsifiers having been found to be advantageous. In addition, particles can be used to stabilize the foam, especially polymer particles and others which are described, for example, in WO 2007/068127 A1.

The emulsifiers, protective colloids or particles may, irrespective of their other properties, have suitable groups, for example ethylenically unsaturated groups, in order to take part in the polymerization reaction to be incorporated into the polymer.

Usable nonionic emulsifiers are aliphatic ethoxylates of long-chain linear or branched alcohols, fatty acid amides or fatty acid amines, and block copolymers of polyethylene oxide/polypropylene oxide or block copolymers of polyethylene oxide/polypropylene oxide with ethylenically unsaturated monomers from (I-A), and also styrene. Preference is given to using ethoxylates of long-chain alkanols, especially of fatty alcohols or oxo alcohols. Suitable alcohols are $C_8$- to $C_{36}$-alcohols, preferably $C_{10}$- to $C_{22}$-alcohols, more preferably $C_{12}$- to $C_{18}$-alcohols. The mean degree of ethoxylation is typically from 3 to 80. In addition, the nonionic emulsifiers used may also be alkylpolyglucosides.

Further useful emulsifiers are preferably of anionic nature. These include neutralized $C_8$- to $C_{12}$-alkyl sulfates of sulfuric monoesters of ethoxylated linear or branched $C_{12}$- to $C_{18}$-alkanols with a mean degree of ethoxylation of from 2 to 80, of $C_{12}$- to $C_{18}$-alkylsulfonic acids, and of $C_8$ to $C_{18}$-alkylarylsulfonic acids, or sulfosuccinic esters or monoesters or ester amides. It is also possible to use neutralized primary or secondary alkyl phosphates or phosphonates or ethoxylated alkyl phosphates or phosphonates with a mean degree of ethoxylation of from 2 to 80 and a $C_{12}$- to $C_{18}$-alkyl radical. The emulsifiers are preferably present in the form of sodium or potassium or ammonium salts, or in the form of substituted ammonium salts, for example the triethanolamine, diethanolamine, monoethanolamine salt.

Further suitable emulsifiers can be found in Houben-Weyl, Methoden der organischen Chemie [Methods of Organic Chemistry], volume XIV/1, Makromolekulare Stoffe [Macromolecular Substances], Georg-Thieme Verlag, Stuttgart, 1961, pages 192 to 208).

Cationic emulsifiers are also suitable. Examples thereof are the dimethyl sulfate-quaternized reaction products of 6.5 mol of ethylene oxide with 1 mol of oleylamine, distearyldimethylammonium chloride, lauryltrimethylammonium chloride, cetylpyridinium bromide and dimethyl sulfate-quaternized stearic acid triethanolamine ester, which is preferably used as a cationic emulsifier.

In addition, it is possible to use suitable protective colloids, alone or in combination with the above emulsifiers, for example polyvinyl alcohols, cellulose derivatives or vinylpyrrolidone-comprising copolymers. A comprehensive description of further suitable protective colloids can be found in Houben-Weyl, Methoden der Organischen Chemie, vol. 14.1, Makromolekulare Stoffe, Georg-Thieme-Verlag, Stuttgart, 1961, pages 411 to 420.

The polymerizable aqueous mixtures may if appropriate, comprise at least one solubilizer. These shall be understood to mean water-miscible organic solvents, for example alcohols, glycols, polyethylene glycols or monoethers derived therefrom, the monoethers comprising no double bonds in the molecule. Suitable ethers are methylglycol, butylglycol, butyldiglycol, methyldiglycol, butyltriglycol, 3-ethoxy-1-propanol and glyceryl monomethyl ether.

The polymerizable aqueous mixture may, if appropriate, comprise thickeners, foam stabilizers, polymerization regulators, fillers and cell nucleators. Thickeners are used, for example, to optimize the foam structure and to improve the foam stability. This achieves the effect that the foam shrinks only slightly during the polymerization. Useful thickeners include all natural and synthetic polymers which are known for this purpose and which significantly increase the viscosity of an aqueous system. They may be water-swellable or water-soluble synthetic and natural polymers. Suitable thickeners are also pulverulent superabsorbents. A comprehensive overview of thickeners can be found, for example, in the publications by R. Y. Lochhead and W. R. Fron, Cosmetics & Toiletries, 108, 95-135 (May 1993) and M. T. Clarke, "Rheological Additives" in D. Laba (ed.) "Rheological Properties of Cosmetics and Toiletries", Cosmetic Science and Technology Series, Vol. 13, Marcel Dekker Inc., New York 1993. Water-swellable or water-soluble synthetic polymers useful as thickeners are, for example, high molecular weight polymers of the above-described monoethylenically unsaturated monomers comprising acid groups. Such thickeners are, for example, high molecular weight homopolymers of acrylic acid and/or methacrylic acid or lightly crosslinked copolymers of acrylic acid and/or methacrylic acid and a compound which comprises at least two ethylenically unsaturated double bonds, for example butane diol diacrylate. Also suitable are high molecular weight polymers of acrylamide and methacrylamide or copolymers of acrylic acid and acrylamide having molar masses of more than 1 million. Such copolymers are known as thickeners. High molecular weight polyethylene glycols or copolymers of ethylene glycol and propylene glycol, and also high molecular weight polysaccharides such as starch, guar seed flour, locust bean flour, or derivatives of natural substances such as carboxymethylcellulose, hydroxyethylcellulose, hydroxymethylcellulose, hydroxypropylcellulose and cellulose mixed ethers, are also known thickeners. A further group of thickeners is that of water-insoluble products, such as fine silica, fumed silicas, precipitated silicas in hydrophilic or hydrophobic polymorphs, zeolites, titanium dioxide, cellulose powder, or fine powders of crosslinked polymers other than superabsorbents.

(I-G) Gas

The gas used is preferably air, carbon dioxide, helium, neon, argon, sulfur hexafluoride and especially nitrogen. In addition, it is possible to use halogenated hydrocarbons, for example dichlorodifluoromethane, 1,2-dichloro-1,1,2,2-tetrafluoroethane. It is of course also possible to use mixtures of these gases.

(I-L) Solvents

The solvents used are preferably liquids which are inert with respect to the reactants used, especially water.

Instead of the ethylenically unsaturated monomers specified in (I-A), it is also possible to use the customary precursors of polyaddition and polycondensation products, i.e., for example, diisocyanates and polyols for the preparation of polyurethane foams.

In the inventive preparation of polymer foams, in a first process stage, a polymerizable aqueous mixture is foamed in a microfluidic process.

In one embodiment of the invention, the foam is produced separately from the polymerization. However, it is also possible to start the polymerization actually in the course of foam formation and to conduct it to completion after the foam formation has ended. The foams which have not yet polymerized fully in the first stage in accordance with the invention are stable over a period, for example up to one hour, and so they can be handled without any problem.

The as yet unpolymerized foam mixtures can, for example, be brought into a suitable shape for the subsequent polymerization in order to produce the shaped bodies desired for a particular application. The waste foam which possibly arises in the shaping of the foamed polymerizable aqueous mixture can be recycled into the process directly. The foamed polymerizable material can, for example, be applied in the desired thickness to a temporary carrier material which is preferably provided with an antiadhesion coating. It is possible, for example, to knife-coat the foam onto a substrate. Another possibility is to fill the polymerizable aqueous foam mixture into molds which likewise have antiadhesive coating, and to polymerize the foam to completion therein.

Since the foamed polymerizable aqueous mixture has a long lifetime, this mixture is also suitable for the production of composite materials. For example, the polymerizable foam produced after mechanical generation can be applied to a permanent carrier material, for example films of polymers (e.g. films of polyethylene, polypropylene or polyamide) or metals, webs, fluff, tissues, wovens, natural or synthetic fibers, or to other foams. In the production of composite materials, it may also be advantageous under some circumstances to apply the polymerizable foam to a carrier material in the form of particular structures or in different layer thickness. However, it is also possible to apply the polymerizable foam to fluff layers and to impregnate it such that the fluff is an integral constituent of the polymer foam after the polymerization. The foamed polymerizable aqueous mixture obtainable in the first process stage can also be shaped to large blocks and polymerized. The blocks can be cut or sawn into smaller shaped bodies after the polymerization. It is also possible to produce sandwichlike structures by applying a foamed polymerizable aqueous mixture to a substrate, covering the foam layer with a film, webs, tissues, wovens, fibers or other foams, if appropriate composed of a material different than the substrate used first, and again applying foam and if appropriate covering with a further film, webs, tissues, wovens, fibers or other foams. The composite is then subjected to polymerization in the second process stage. However, it is also possible to produce sandwichlike structures with further foam layers.

In the second stage of the process for producing the inventive polymer foams, the foamed polymerizable aqueous mixture is polymerized. According to the initiator used, the polymerization can be effected by increasing the temperature, by the action of light, by irradiating with electron beams or else by increasing the temperature and the action of light. In order to increase the temperature of the foamed polymerizable aqueous mixture, it is possible to employ all methods customary in industry, for example to contact the foam with heatable plates, to expose the polymerizable foam to infrared radiation or to heat with the aid of microwaves. If relatively thick layers of a polymer foam are to be produced, for example foams with thicknesses of several centimeters, the heating of the polymerizable foamed material with the aid of a microwave is particularly advantageous, because relatively homogeneous heating can be achieved in this way.

The polymerization is effected, for example, at temperatures of from 20 to 180° C., preferably in the range from 20 to 100° C.

In the case of initiation of the polymerization by the action of light on the foamed, polymerizable material, it is possible to employ all conventional illuminator systems, provided that their emission spectrum is adapted to the photoinitiator used. When the polymerization is initiated by illumination, it is advantageous to use a combination of a photoinitiator and of a thermal initiator and/or or else a photoinitiator which can also act as a thermal initiator, for example azoinitiators. Since the foam is heated significantly as a result of the high heat of polymerization during the polymerization, substantially quicker and more effective progress of the polymerization reaction is achieved in this way. In the case of initiation by the action of light, the polymerization temperature is in the range from 0 to 150° C., preferably from 10 to 100° C.

A significant advantage of the process according to the invention is considered to be that the polymerization proceeds with substantial retention of the structure of the foamed polymerizable aqueous mixture, i.e. the polymerizable foam changes its volume only insignificantly during the polymerization. The polymerization reaction is influenced by the start temperature, the initiation technique or the removal of heat. The polymerization temperature is preferably controlled to the effect that boiling of the polymerizable aqueous mixture is prevented. With advancing polymerization, solidification of the polymer foam occurs owing to increasing gel formation. After the polymerization has ended, a hydrogel foam is present, which has a water content of from 30 to 80% by weight. According to the process, open-cell or closed-cell polymer foams can be produced.

For the use of the polymer foam as a superabsorbent, a residual moisture content of from 1 to 45% by weight, preferably from 15 to 35% by weight, is desirable. The hydrogel foam obtained in the polymerization is therefore usually dried. In order to obtain a flexible polymer foam, the foam must have a certain residual moisture content. The water content depends significantly on the density of the foam produced. The higher the density, the greater the residual moisture content which has to be established. An upper limit of from 35 to 45% by weight of water may therefore quite possibly be advisable. When a mixture with a very high solids content is polymerized and gives rise to a polymer foam with a very high density, it may even be necessary to moisten the polymer foam further after the polymerization in order to obtain the necessary flexibility.

The polymer foam can be dried with the aid of all conventional techniques, for example by heating with a hot gas stream, by applying reduced pressure, by infrared irradiation or by heating with microwave radiation. Here too, microwave radiation is again found to be advantageous in the drying of large-volume shaped bodies.

After the process according to the invention, a predominantly or at least partly open-cell foam, which is relatively hard and brittle, is generally obtained. The production of closed-cell foams is possible by adjusting the reaction conditions, especially in the case of very rapid polymerization.

For many applications, however, foams which are flexible are required. The initially obtained relatively hard and brittle polymer foam can, however, be flexibilized. This can be done with the aid of external plasticizers or by means of internal flexibilization.

External plasticizers are components which, in addition to the gel-forming components, are either added to the reaction mixture before the foaming or which are applied subsequently to the polymer foam. Useful plasticizers include, for example, hydrophilic and hygroscopic substances. External flexibilization is achieved primarily by the controlled establishment of a particular residual water content. In addition, the flexibilization can be improved by the use of, for example, polyols such as glycerol, polyalkylene glycols such as polyethylene glycols or polypropylene glycols, or cationic emulsifiers. Suitable cationic emulsifiers are, for example, dimethyl sulfate-quaternized reaction products of 1 mol of oleylamine with from 5 to 10 mol of ethylene oxide, distearyldimethylammonium chloride, lauryltrimethylammonium chloride, cetylpyridinium bromide and ethanolamine esters of long-chain fatty acids such as stearic acid diethanolamine ester, stearic acid monoethanolamine ester and stearic acid triethanolamine ester, which is preferably used as the external plasticizer.

Internal flexibilization of the polymer foam is understood to mean the use of plasticizing components which are incorporated into the gel structure. These may be substances which themselves bear unsaturated groups and are present in the polymerization as monomers in the polymerizable aqueous mixture and are also incorporated into the gel structure or react with the gel-forming material. The internal plasticizer is intended to bring about a lowering of the glass transition temperature of the polymer which constitutes the polymer foam. Suitable internal plasticizers are, for example, olefins, esters of ethylenically unsaturated $C_3$ to $C_5$-carboxylic acids and monohydric $C_2$ to $C_{30}$-alcohols, or polyethylene glycol or polypropylene glycol monoesters of monoethylenically unsaturated $C_3$- to $C_5$-carboxylic acids. For internal flexibilization, suitable monomers are those monomers (b) which lower the glass transition temperature of the copolymers formed with the monomers (a), for example vinyl esters of saturated carboxylic acids comprising at least 4 carbon atoms, alkyl vinyl ethers having at least 2 carbon atoms in the alkyl group, vinyllactams and alkyl-substituted styrenes such as ethylstyrene.

It may be desirable to subsequently modify the degree of crosslinking of the polymer foam. In order to achieve this aim, it is possible, for example, to incorporate latent crosslinking sites into the gel during the polymerization by the addition of suitable monomers which do not lead to crosslinking reactions under the conditions of the polymer foam production but, under specific conditions which can be employed subsequently, for example by means of significantly elevated temperature, are capable of forming further crosslinking points in the gel structures Examples of such monomers may be the introduction of compounds which comprise hydroxyl groups and are capable at elevated temperature, i.e. at temperatures above 150° C., of reacting with the carboxyl groups in the polymer foam structure. Suitable compounds which have latent crosslinking sites are, for example, hydroxyethyl acrylate, hydroxypropyl acrylate, hydroxybutyl acrylate, monoacrylates of glycerol, monoacrylates or monomethacrylates of polyethylene glycols having at least two ethylene glycol units, monoacrylates or monomethacrylates of polypropylene glycols having at least two propylene glycol units, and monomethacrylates of polyhydric alcohols, for example hydroxybutyl methacrylate, hydroxypropyl methacrylate, hydroxyethyl methacrylate or glyceryl monomethacrylate.

A further means of homogeneous postcrosslinking is that of the subsequent addition of crosslinking reagents, i.e. compounds which have at least two reactive groups which are capable under suitable conditions, for example when heated to temperatures above 70° C., of reacting with the acid groups of the hydrogel foam. In this case, it is also possible, controlled via the penetration depth of the crosslinker, to achieve a modification of the inhomogeneous crosslinking density. Suitable crosslinkers form covalent or ionic bonds with the carboxyl groups of the polymer matrix. Suitable crosslinking agents are compounds which have at least two functional groups of the same type or different types, for example hydroxyl, amino, quaternary ammonium, isocyanato, epoxy, aziridino, ester or amide groups. Preferred postcrosslinking agents are polyalcohols such as glycerol or bisepoxides. The crosslinking agent can be applied to the foamed material, for example, by spraying, dipping or by gas phase deposition.

The inventive polymer foams have, for example, a density of from 0.001 to 1.8 $g/cm^3$, preferably from 0.005 to 1 $g/cm^3$. The density of polymer foams is determined gravimetrically.

From a homogeneous polymer foam layer with a defined thickness between 3 and 5 mm, a sharp knife, for example, is used to cut out squares with a side length of 5 cm. These samples are weighed and the weight obtained is divided by the volume calculated from the dimensions.

In order to determine the fractions which are extractable from the polymer foam, a dried and ground polymer foam sample is dispersed in a 0.9% by weight sodium chloride solution and the dispersion is stirred for 1 hour. Thereafter, the foam material is filtered off and the amount of the fraction extracted is determined titrimetrically in the filtrate.

The absorption capacity of the polymer foam of water per gram of polymer foam is determined on polymer foam pieces which have a thickness of 3 mm and each weigh 1 g. The retention is tested here by the so-called teabag test. The liquid used here is a 0.9% sodium chloride solution. 1 g of the foam material is filled into a teabag which is then sealed. The teabag is then immersed into the liquid for a particular time and, after a dripping time of 10 minutes, weighed again. For the calculation of the absorption capacity, a blank test has to be carried out, in which a teabag without polymer foam is immersed into the solution and the weight of the teabag after the above-specified dripping time of 10 minutes is determined. The absorption capacity is then calculated from the following relationship:

$$\text{absorption capacity} = \frac{\text{weight of the teabag with polymer foam} - \text{weight of the teabag in the blank test}}{\text{initial weight of the polymer foam}}$$

The retention is calculated as follows:

Same procedure as above, except that, instead of the dripping of the teabag, it is spun in a centrifuge at an acceleration of 250 g for 3 min.

$$\text{Retention} = \frac{\text{weight of the teabag after spinning} - \text{weight of the teabag in the blank test}}{\text{initial weight of the polymer foam}}$$

The absorption speed (referred to hereinafter as AS) was determined by cutting rectangular samples with a weight of 1 g out of homogeneously 3 mm-thick polymer foam layers with the aid of a sharp knife. These samples were covered with 20 g of test fluid in a Petri dish. A stopwatch was used to determine the time that the polymer foam needed to fully absorb the test fluid. The absorption rate (AS) in g/g-sec was calculated to be:

AS=20 g/[1 g*time measured (in sec)]

In addition, in this test, the homogeneity of the liquid absorption is rated according to a 6-level scale. The ratings 1-6 have the following meanings:

1. The polymer foam swells homogeneously from the start.
2. The polymer foam swells homogeneously after a few seconds.
3. The polymer foam swells homogeneously after 30 sec.
4. The polymer foam swells inhomogeneously for the whole time, but only a small portion is affected.
5. The polymer foam swells inhomogeneously for the whole time, but a significant portion is affected.
6. The polymer foam swells only at the surface for the whole time.

Formulation for the Test Fluid:

The following salts are dissolved in 1 liter of distilled water:
2.00 g KCl
2.00 g $Na_2SO_4$
0.85 g $NH_4H_2PO_4$
0.15 g $(NH_4)_2HPO_4$
0.19 g $CaCl_2$
0.23 g $MgCl_2$ The salts used must be anhydrous.

Stability of the polymer foam in the swollen state

Using the samples obtained in the above test, the stability of the fully swollen material was rated according to a 4-level scale. The ratings 1-4 mean:

1. The polymer foam can be removed intact from the Petri dish and can be bent by 180° without tearing.
2. The polymer foam can be removed intact from the Petri dish.
3. The polymer foam tears when removed from the Petri dish.
4. The polymer foam breaks up to give an incoherent gel mass:

The above-described water-absorbing polymer foams can be used for all purposes for which the polymer foams described in the literature are used. They are used, for example, in sanitary articles which are used for adsorption of body fluids and in dressing material for covering wounds. They are suitable, for example, as a water-absorbing constituent in diapers, sanitary napkins and incontinence articles. They can be used in the form of composite materials. Polymer foams can also be used as sealant material, as a soil improver, as a soil replacement and as a packaging material. Specific configurations of articles which comprise polymer foams are, for example, described comprehensively in WO-A-94/22502. The polymer foams are also suitable for dewatering sludges, for thickening aqueous coatings, for example for the disposal of residual amounts of unused aqueous coatings or paints, by, for example, adding pulverulent polymer foams to aqueous coating residues until solidification occurs. The polymer foams can also be used to dewater water-containing oils. They can, for example, be used in the above-described applications in the form of a powder having a mean particle diameter of from 150 µm to 5 mm.

Owing to their properties, the above-described foams can assume various functions in hygiene articles in the storage of body fluids:

acquisition
distribution and/or
storage.

The storage of body fluids is fulfilled completely by the foams, while further constituents such as high-loft nonwovens, polypropylene webs, polyester webs or chemically modified pulps may, if appropriate, find use in a supporting role as a layer on the foams for the functions of acquisition and distribution.

The percentages in the example which follows mean percent by weight, unless otherwise evident from the context.

Example

The following streams are introduced into a microfluidic reactor according to FIG. 1 with a diameter of the exit channel of 550 µm:

$Q_{L1}$: solution L1: 2-3.3 ml/minute
$Q_{L2}$: solution L2: 2-3.3 ml/minute
$Q_G$: gas: 0.4 ml/minute The gas used was air or nitrogen.

The composition of the solutions L1 and L2 is shown in the following Table 1:

TABLE 1

| Compound | Amount [g] | L1 | L2 |
|---|---|---|---|
| Acrylamide | 20 | X | — |
| N,N'-Methylenebisacrylamide | 0.53 | X | — |
| N,N,N',N'-Tetramethylethylenediamine | 1.57 | X | — |
| Ethylene oxide addition products | 0.18 | X | — |
| Distilled water | 48 | X | — |
| Sodium peroxodisulfate | 4 | — | X |
| Ethylene oxide addition products | 0.18 | — | X |
| Distilled water | 50 | — | x |

The polymerization began as soon as liquids L1 and L2 came into contact. At the same time, bubbles of the gas G supplied formed in the stream in the exit channel K, interspersed and enveloped by the solutions L1 and L2 and their reaction products. From the exit orifice of the reactor emerged a partly already polymerized foam. This foam was polymerized to completion under the following conditions:
Temperature: 20° C.
Time: 30-60 seconds
The finished foam had the following parameters:
Structure: dense packing of the bubbles (hexagonally densest packing)
Morphology: Mostly open-cell foams
Specific surface area: $1.5 \times 10^4$ m$^2$/m$^3$
Absorption capacity: 15 g/g.

Owing to its properties, the resulting foam can be used to absorb body fluids. It can be used, inter alia, in dressing material for covering wounds, as sealant material, as a soil improver, as a soil replacement and as a packaging material.

The invention claimed is:

1. A process for producing polymer foams which comprises
contacting a solution L1 comprising at least one polymerizable compound which polymerizes in a subsequent process stage and a solvent L, and optionally at least one solution L2 comprising a polymerizable compound and a solvent which may be identical or nonidentical to the solvent from L1, with
one or more gas(es) G which is/are only partly dissolvable, if at all, in the solvents used,
at least one of the solutions comprising an emulsifier or another assistant, to form a foam as a result of development of struts and/or walls by the solutions which enclose the gas G as bubbles, and
wherein the solutions and the gas G are contacted under microfluidic process conditions to develop bubbles of the gas G, and wherein polymerization starts in the course of foam formation.

2. The process according to claim 1, wherein the solutions and the gas G are contacted in an exit channel K of a microreactor, the gas G and the solutions moving in a common flow direction within the exit channel K.

3. The process according to claim 1, wherein the gas G used is air, nitrogen, carbon dioxide, helium, neon, argon, sulfur hexafluoride, halogenated hydrocarbons or mixtures thereof.

4. The process according to claim 1, wherein the contacting step includes the solution L2 and the solution L2 comprises in each case at least one monoethylenically unsaturated monomer, a crosslinker, an initiator and an emulsifier.

5. The process according to claim 1, wherein the solvent L1 is or comprises water.

6. The process according to claim 1, wherein
the polymerizable compound is selected from the group consisting of: acrylic acid, methacrylic acid, acrylamide, methacrylamide, vinylsulfonic acid, 2-acrylamido-2-methylpropanesulfonic acid and mixtures thereof, and
the assistant is a crosslinker selected from the group consisting of: N,N'-methylenebisacrylamide, ethylene glycol diacrylate, propylene glycol diacrylate, butanediol diacrylate, ethylene glycol dimethacrylate, propylene glycol dimethacrylate, allyl methacrylate and mixtures thereof.

7. The process according to claim 1, wherein the assistant is a crosslinker comprising one or more selected from the group consisting of: monomers having at least two ethylenically unsaturated double bonds, compounds having at least one polymerizable, ethylenically unsaturated group and at least one further functional group, compounds having at least two functional groups, and polyvalent metal ions or multifunctional bases.

8. The process according to claim 1, wherein the polymerization of the polymerizable compound is initiated by compounds which decompose to free radicals, by means of high-energy radiation, or by increasing the temperature or by means of redox catalysts.

9. The process according to claim 2, wherein the diameter of the exit channel K is from 10 micrometers to 1000 micrometers, and the internal volume per exit channel K is from $10^{-5}$ mm$^3$ to 1 cm$^3$, and the length of the exit channel corresponds to several times its diameter.

10. A polymer foam obtained from the process of claim 1, the polymer foam having a narrow bubble size distribution and a high surface-to-volume ratio of greater than 1,000 m$^2$/m$^3$.

11. A method for the production of a sanitary article which comprises utilizing the polymer foam according to claim 10 in the article.

12. The method as claimed in claim 11, wherein the article is
(1) used for absorption of body fluids,
(2) in dressing material for covering wounds,
(3) a sealing material,
(4) a soil improver,
(5) a soil replacement or
(6) a packaging material.

13. A process for producing polymer foams which comprises:
contacting a solution L1 comprising at least one polymerizable compound which polymerizes in a subsequent process stage and a solvent L, and optionally at least one solution L2 comprising a polymerizable compound and a solvent which may be identical or nonidentical to the solvent from L1, with
one or more gas(es) G which is/are only partly dissolvable, if at all, in the solvents used,
at least one of the solutions comprising an emulsifier or another assistant, to form a foam as a result of development of struts and/or walls by the solutions which enclose the gas G as bubbles,
wherein the solutions and the gas G are contacted under microfluidic process conditions to develop bubbles of the gas G;
wherein the polymerizable compound is selected from the group consisting of: acrylic acid, methacrylic acid, acrylamide, methacrylamide, vinylsulfonic acid, 2-acrylamido-2-methylpropanesulfonic acid and mixtures thereof, and wherein the assistant is a crosslinker selected from the group consisting of: N,N'-methylenebisacrylamide, ethylene glycol diacrylate, propylene glycol diacrylate, butanediol diacrylate, ethylene glycol dimethacrylate, propylene glycol dimethacrylate, allyl methacrylate and mixtures thereof.

14. A process for producing polymer foams which comprises:
contacting a solution L1 comprising at least one polymerizable compound which polymerizes in a subsequent process stage and a solvent L, and optionally at least one solution L2 comprising a polymerizable compound and a solvent which may be identical or nonidentical to the solvent from L1, with
one or more gas(es) G which is/are only partly dissolvable, if at all, in the solvents used,
at least one of the solutions comprising an emulsifier or another assistant, to form a foam as a result of development of struts and/or walls by the solutions which enclose the gas G as bubbles,
wherein the solutions and the gas G are contacted under microfluidic process conditions to develop bubbles of the gas G; and
wherein the assistant is a crosslinker comprising one or more selected from the group consisting of: monomers having at least two ethylenically unsaturated double bonds, compounds having at least one polymerizable, ethylenically unsaturated group and at least one further functional group, compounds having at least two functional groups, and polyvalent metal ions or multifunctional bases.

15. A process for producing polymer foams which comprises:
contacting a solution L1 comprising at least one polymerizable compound which polymerizes in a subsequent process stage and a solvent L, and optionally at least one solution L2 comprising a polymerizable compound and a solvent which may be identical or nonidentical to the solvent from L1, with
one or more gas(es) G which is/are only partly dissolvable, if at all, in the solvents used,
at least one of the solutions comprising an emulsifier or another assistant, to form a foam as a result of development of struts and/or walls by the solutions which enclose the gas G as bubbles,
wherein the solutions and the gas G are contacted under microfluidic process conditions to develop bubbles of the gas G; and
wherein the polymerization of the polymerizable compound is initiated by compounds which decompose to free radicals, by means of high-energy radiation, or by increasing the temperature or by means of redox catalysts.

* * * * *